Oct. 7, 1969 F. W. PARRISH ET AL 3,471,767

PARALLELING REACTOR FOR TWO-WAY CIRCUITS
EMPLOYING AN AUXILIARY BUS

Filed Dec. 6, 1967

INVENTORS
FRANK W. PARRISH
GERALD F. DULIN

BY

OSTROLENK, FABER, GERB & SOFFEN
ATTORNEYS

United States Patent Office 3,471,767
Patented Oct. 7, 1969

3,471,767

PARALLELING REACTOR FOR TWO-WAY CIRCUITS EMPLOYING AN AUXILIARY BUS

Frank W. Parrish, El Segundo, and Gerald F. Dulin, Torrance, Calif., assignors to International Rectifier Corporation, El Segundo, Calif., a corporation of California Filed Dec. 6, 1967, Ser. No. 688,501
Int. Cl. H02m 7/22
U.S. Cl. 321—27 5 Claims

ABSTRACT OF THE DISCLOSURE

A paralleling reactor arrangement for two-way circuits in which a first group of diodes are mounted on an auxiliary bus connected to the A-C line which serves as a good heat sink and the second group of diodes are mounted on one of the D-C bus bars which serves as a heat sink. The A-C bus serves as one turn for each of a plurality of reactors, and each of the diodes is provided with a series winding wound on a corresponding reactor.

This invention relates to a paralleling reactor for forcing equal current distribution between a plurality of parallel connected diodes.

It is well known that reactors can be used to magnetically couple parallel connected circuits which contain diodes to insure the correct distribution or sharing of current between the diodes.

The present invention provides a novel arrangement for use in a two-way circuit which forces current balance between parallel diodes while permitting one-half of the diodes to be mounted on an auxiliary but connected to an A-C bus and the other half on one D-C bus, with the buses serving as good heat sinks for the diodes. This is useful where the buses are water-cooled or forced-air cooled to improve the heat sink efficiency. In accordance with the invention, the A-C bus of the corresponding phase is used as a single turn for each of a plurality of reactors with a winding on each reactor connected to a respective diode. Each of the diodes may then be of the same polarity construction with each diode secured directly to its heat sink. Moreover, the cores are subjected to A-C energization, thereby minimizing the effect of residual magnetism left in the core as where the core is subject to pulsating D-C energization.

Therefore, a primary object of this invention is to provide a novel paralleling reactor arrangement for a two-way rectifier system which permits use of similar polarity diodes which are each mounted directly on common bus bar heat sinks.

Another object of this invention is to provide a novel paralleling reactor system which uses bus bars as a reference winding for each of a plurality of balancing reactors.

Another important object of this invention is to provide a current balancing arrangement which permits the mounting of diodes in a common heat sink and eliminates the need for a plurality of short heat sinks insulated from one another, each receiving only a few diodes.

These and other objects of this invention will become apparent from the following description when taken in connection with the drawings in which.

Figure 1:
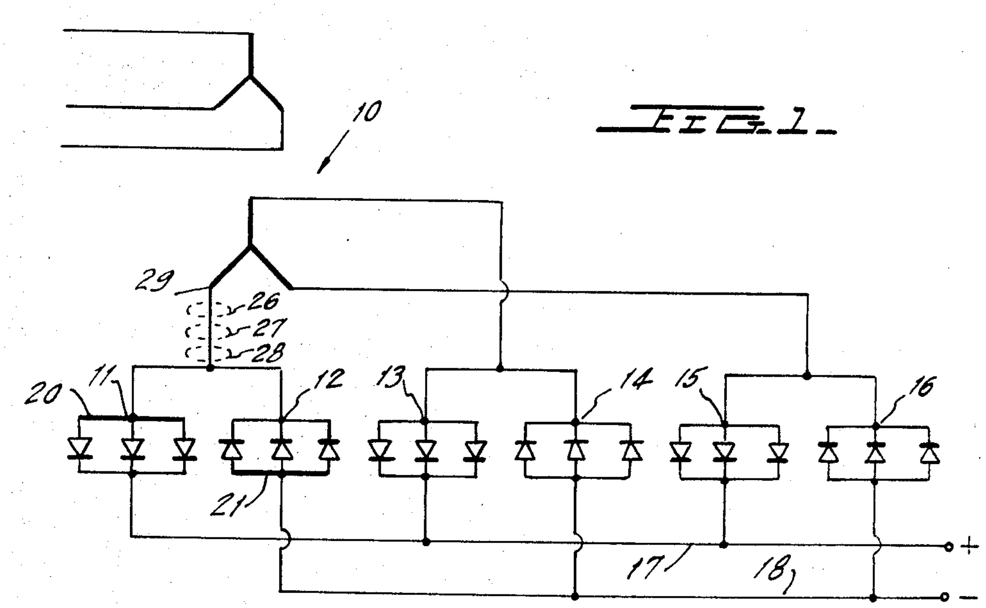
FIGURE 1 shows a typical well-known three-phase two-way rectifier system which can incorporate the present invention.

Referring to FIGURE 1, there is shown a three-phase rectifier transformer 10 with each arm of each phase of the rectifier containing parallel connected diode groups 11 to 16. Three parallel connected diodes are shown in each group, but the number to be used may be any number desired, depending on the current rating of the rectifier system. Each of groups 11, 13 and 15 is connected to a common positive bus 17, while each of groups 12, 14 and 16 is connected to negative bus 18.

In order to insure proper current sharing between the parallel connected diodes of the various diode groups 11 to 16, it is known to use paralleling reactors which magnetically couple the parallel diodes. In accordance with the invention and as shown in FIGURE 2, a novel balancing arrangement is shown which permits use of the same polarity diode devices throughout the rectifier system, with the diodes each mounted on a bus bar heat sink.

Figure 2:
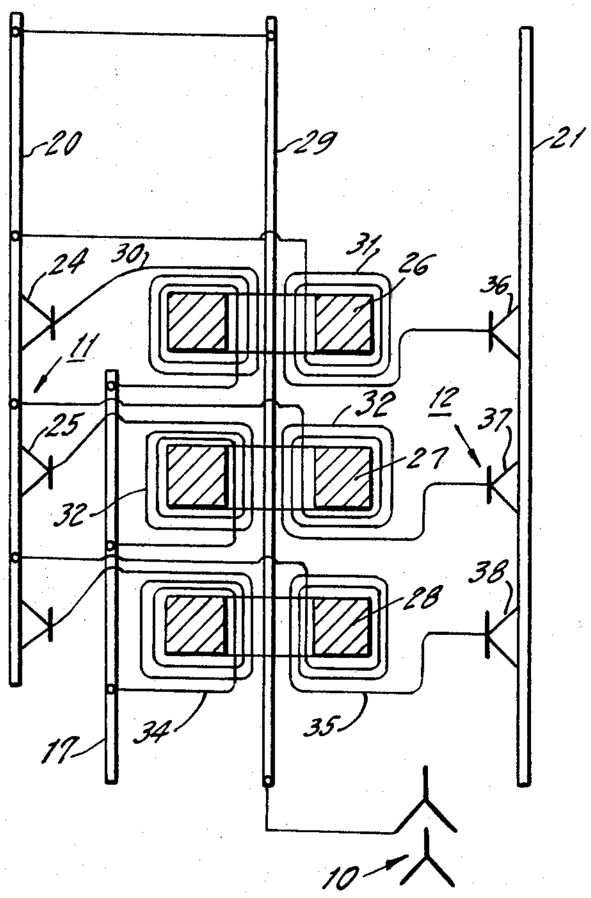
FIGURE 2 shows how the present invention may be applied to one phase of the circuit of FIGURE 1.

Referring to FIGURE 2, the arrangement shown for the phase illustrated will be used for the other phases of FIGURE 1 as well. The type diodes selected is the commercially available stud-mounted type in which the stud is the anode. Stud cathode diodes could also be used. Note that the diodes could also be controlled rectifiers.

In FIGURE 2, the diode group 11 is mounted on an auxiliary bus section 20 as by threading conventional studs of the diodes into tapped openings in the bus. The diode group 12 is similarly mounted on negative bus section 21. Both bus sections 20 and 21 may be standard water-cooled buses, or forced-air cooled buses.

Figure 3:
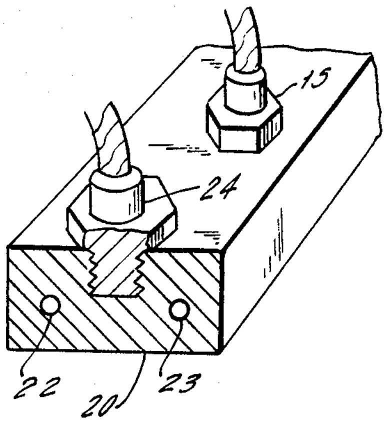
FIGURE 3 shows a partial cross-section of one of the buses of FIGURE 2.

FIGURE 3 shows bus 20 in cross-section as containing water passages 22 and 23 in the usual manner with diodes 24 and 25 of group 11 threaded into the bus 20.

The paralleling reactors for the diodes of FIGURE 2 are shown schematically in cross-section in FIGURE 2 as toroidal reactors 26, 27 and 28, which may be formed of the well-known "C-core" type A-C bus bar 29 (see FIGURE 1) then extends through the center of cores 26, 27 and 28, and serves as a single turn reference winding for each of the cores 26, 27 and 28.

Each of reactors 26, 27 and 28 then carry two three-turn windings 30–31, 32–33 and 34–35, respectively. Windings 30, 32 and 34 are connected in series wtih the cathode terminals of diodes 24, 25 and 35, respectively, of group 11 and the positive bus bar 17. In a similar manner, windings 31, 33 and 35 are connected to the cathode terminals of diodes 36, 37 and 38, respectively, of group 12 and the auxiliary bus bar 20 (and thus the A-C line on bus 29).

The number of turns of each of windings 30 to 35 is determined by the number of diodes in each of groups 11 and 12. If 10 diodes were used for each group, for example, 10 balancing cores would be used, each having two windings of ten turns each.

In operation, and considering the current in diode 24, it is desired that this diode current be one-third the current of bus 29. If the current of diode 24 is less than this value, the winding formed by bus 29 will induce a voltage in winding 30 tending to increase the current in diode 24 until it is at its desired value. Similarly, if the current is diode 24 is too high, a bucking voltage will be induced in winding 30 to reduce this current.

Each of windings 30 to 35 will operate in a similar manner to tend to force the desired balance of current for their respective diodes.

Windings 31, 33 and 35 are wound such that the magnetomotive force due to bus 29 will be in an opposite direction from that during conduction of diodes 24, 25 and 35.

The embodiments of the invention in which an exclusive privilege or property is claimed are defined as follows:

1. A current balancing system for parallel connected semiconductor devices in a two-way rectifier; said two-way rectifier system including an A-C conductor; said A-C conductor connected in series with a first and a second plurality of parallel connected semiconductor devices; each of said semiconductor devices having anode electrodes and cathode electrodes; the said anode electrodes of said first plurality of semiconductor devices connected to said A-C conductor; the said cathode electrode of said second plurality of semiconductor devices connected to said A-C conductor; a negative bus, a positive bus and an auxiliary bus; said first plurality of semiconductor devices mounted directly on said auxiliary bus bar in heat exchange relation therewith; said second plurality of semiconductor devices mounted on one of said positive and negative bus bars and in heat exchange relation therewith; a plurality of magnetic cores encircling said A-C conductor; first and second windings on each of said plurality of magnetic cores; each of said first plurality of semiconductor devices connected in series with said auxiliary bus bar, a respective one of said first windings, and the other of said positive or negative bus; each of said second plurality of semiconductor devices connected in series with said one of said positive or negative bus bars, a respective winding of said second plurality of windings and said auxiliary bus bar.

2. The system of claim 1 wherein said semiconductor devices are diodes.

3. The system of claim 1 wherein said devices of said first and second semiconductor devices are of the same polarity type.

4. The system of claim 3 wherein said second plurality of devices are connected to said negative bus bar.

5. The system of claim 1 wherein the number of turns of each of said first and second plurality of windings is equal to the number of semiconductor devices in said first and second plurality of semiconductors, respectively.

References Cited

UNITED STATES PATENTS

| | | | |
|---|---|---|---|
| 3,042,849 | 7/1962 | Dortort | 321—27 |
| 3,081,424 | 3/1963 | Dortort | 321—8 |
| 3,193,754 | 7/1965 | Dortort | 321—27 |

JOHN F. COUCH, Primary Examiner

G. GOLDBERG, Assistant Examiner